(12) United States Patent
Herz et al.

(10) Patent No.: US 8,160,586 B2
(45) Date of Patent: Apr. 17, 2012

(54) MOBILE LINK SELECTION METHOD FOR ESTABLISHING HIGHLY EFFICIENT COMMUNICATIONS BETWEEN MOBILE DEVICES

(75) Inventors: Frederick S. M. Herz, Warrington, PA (US); Jonathan M. Smith, Princeton, NJ (US)

(73) Assignee: Perdiso Co. Limited Liability Company, Wilmington, DE (US)

( * ) Notice: Subject to any disclaimer, the term of this patent is extended or adjusted under 35 U.S.C. 154(b) by 715 days.

(21) Appl. No.: 10/205,182

(22) Filed: Jul. 24, 2002

(65) Prior Publication Data

US 2006/0052142 A1    Mar. 9, 2006

Related U.S. Application Data

(60) Provisional application No. 60/307,330, filed on Jul. 24, 2001.

(51) Int. Cl.
*H04W 4/00* (2009.01)

(52) U.S. Cl. ............... 455/435.2; 455/90.1; 455/166.2; 455/445; 455/450; 455/556.1; 455/566; 455/575.9

(58) Field of Classification Search .............. 455/76, 455/90.1–90.3, 166.2, 412, 445, 556.1, 557, 455/566, 569.1, 575.9, 569.2, 168.1, 553.1, 455/450–452.2, 412.1
See application file for complete search history.

(56) References Cited

U.S. PATENT DOCUMENTS

| | | | |
|---|---|---|---|
| 5,678,196 A * | 10/1997 | Doyle ........................... | 455/466 |
| 5,754,938 A * | 5/1998 | Herz et al. ..................... | 725/116 |
| 5,826,195 A * | 10/1998 | Westerlage et al. ........ | 455/456.3 |
| 5,953,319 A * | 9/1999 | Dutta et al. ................... | 370/238 |
| 6,014,566 A * | 1/2000 | Owada .......................... | 455/444 |
| 6,175,743 B1 * | 1/2001 | Alperovich et al. .......... | 455/466 |
| 6,748,246 B1 * | 6/2004 | Khullar .......................... | 455/574 |
| 6,839,614 B1 * | 1/2005 | Timko et al. ..................... | 701/1 |
| 6,934,558 B1 * | 8/2005 | Sainton et al. ............. | 455/552.1 |
| 2002/0105913 A1 * | 8/2002 | Miya ............................. | 370/241 |

OTHER PUBLICATIONS

Corson, et al., "Mobile Ad Hoc Networking (MANET): Routing Protocol Performance Issues and Evaluation Considerations," The Internet Engineering Task Force, Mobile Ad-Hoc Networks Working Group, Internet Draft, Jan. 1999.
Macker, et al., "Mobile Ad Hoc Networking and the IETF," Mobile Computing and Communications Review, 2, 1, 1998, 9-14.
Corson, et al., "Mobile Ad Hoc Networking (MANET): Routing Protocol Performance Issues and Evaluation Considerations," Oct. 1998.
Briesemeister, et al., "Role-Based Multicast in Highly Mobile but Sparsely Connected Ad Hoc Networks," Proceedings of the ACM/IEEE Workshop on Mobile Ad Hoc Networking and Computing (MOBIHOC), Boston, MA, 45-50, Aug. 2000.
Lee, et al., "Neighbor Supporting Ad Hoc Multicast Routing Protocol," Proceedings of the ACM/IEEE Workshop on Mobile Ad Hoc Networking and Computing (MOBIHOC), Boston, MA, Aug. 2000.

(Continued)

*Primary Examiner* — Charles Appiah
*Assistant Examiner* — Jaime Holliday
(74) *Attorney, Agent, or Firm* — Woodcock Washburn LLP

(57) ABSTRACT

The present invention provides a new solution to reliable communication between automobiles and other communications devices. It relies on multiple available wireless bands and the addition of significant memory buffering to automobiles. The memory buffering is used to enable a new communications model for messages that is referred to as Mobile Message Memory Queues (M3Qs). A significant benefit of the communication device is the ease in which it can be incorporated into an automobile.

12 Claims, 2 Drawing Sheets

OTHER PUBLICATIONS

Pei, et al., "Lanmar: Landmark Routing For Large Scale Wireless Ad Hoc Networks With Group Mobility," Proceedings of the ACM/IEEE Workshop on Mobile Ad Hoc Networking and Computing (MOBIOC), Boston, MA, Aug. 2000.

Zhou et al., "Content Based Multicast (CBM) in Ad Hoc Networks," Proceedings of the ACM/IEEE Workshop on Mobile Ad Hoc Networking and Computing (MOBIHOC), Boston, MA, Aug. 2000, 5160.

Perkins, et al., "Ad Hoc On-Demand Distance Vector (AODV) Routing," Internet Draft, IETF Mobile Ad Hoc Networking Working Group, Jul. 2000.

Lakshminarayanan, et al., "An Architecture For Building Self-Configurable Systems," IEEE/ACM Workshop on Mobile Ad Hoc Networking and Computing, Aug. 2000.

Todd, et al., "Low Power Rendezvous in Embedded Wireless Networks," Proceedings of $1^{st}$ Workshop on Mobile Ad Hoc Networking and Computing, MobiHOC, Aug. 11, 2000.

Gerla, et al., "Tree Multicast Strategies in Mobile, Multihop Wireless Networks," ACM/Baltzer Mobile Networks and Applications, Mobile Ad Hoc Networking, 4, 3, Oct. 1999, 193-207.

Sass, "Communications Networks for the Force XXI Digitized battlefield," ACM/Baltzer Mobile Networks and Applications, Mobile Ad Hoc Networking, 4, 3, Aug. 1999, 139-155.

Hass, et al., "The Zone Routing Protocol (ZRP) For Ad Hoc Networks," Internet Draft, Aug. 1998, IETF Mobile Ad Hoc Networking Working Group.

Qiao, et al., "Load Balancing Via Relay In next Generation Wireless Systems," Proceeding of IEEE Mobile Ad Hoc Networking & Computing, 2000.

Broch, et al., "The Dynamic Source Routing Protocol For Mobile Ad Hoc Networks," Internet Draft, IETF Mobile Ad Hoc Networking Working Group, Mar. 13, 1998, 44 pages.

Perkins, "Mobile Ad Hoc Networking Terminology", Internet Engineering Task Force, Internet Draft, Nov. 17, 1998, 11 pages.

Corson, et al., Internet-Based Mobile Ad Hoc Networking, IEEE Internet Computing, 3(4), Jul./Aug. 1999, 8 pages.

Corson, et al., "Mobile Ad Hoc Networking (MANET): Routing Protocol Performance Issues and Evaluation Considerations," Internet draft, draft-IRTF-MANET-Issues-00, Sep. 1997, 8 pages.

Baker, et al., "Flat vs. Hierarchical Network Control Architecture," ARO/DARPA Workshop on Mobile Ad-Hoc Networking, http://www.isr.umd/Courses/Workshops.MANET/program.html, Mar. 1997.

Perkins, "Ad Hoc On-Demand Distance Vector (AODV) Routing," Internet Draft, Mobile Ad Hoc Networking (MANET) Working Group of the Internet Engineering Task Force (IETF), Oct. 19, 2003, 27 pages.

Corson, et al., "Internet-Based Mobile Ad-Hoc Networking and Its Applicability to Future Tactical Networking," Proc. ATIRP'99, College Park, MD.

Corson et al., "Mobile Ad Hoc Networking (MANET): Routing Protocol Performance Issues and Evaluation Considerations," RFC 2501, IETF Network Working Group, Jan. 1999.

Marchent et al., "Transport Interworking between $3^{rd}$ Generation Mobile Systems and ATM Fixed Network," Globecom'96, 1, 252-256, Mobile Ad Hoc Networking Terminology, http://www.ieff.org, Nov. 1998.

Park, et al., "Temporally-ordered Routing Algorithm (TORA)" version 1, Internet Draft, Aug. 7, 1998, IETF Mobile Ad Hoc Networking Working Group, 21 pages.

Lee, et al., "INSIGNIA: Inband Signaling Support For QOS In Mobile Ad Hoc Networking," Proceedings of $5^{th}$ International Workshop on Mobile Multimedia Communication, Oct. 12-14, 1998.

Jiang, et al., "Cluster Based Routing Protocol (CBRP) Functional Specification," Internet Draft, Aug. 1998, IRTF Mobile Ad Hoc Networking Working Group, 13 pages.

Corson, "Flat Scalability—Fact or Fiction?" ARO/DARPA Workshop on Mobile Ad Hoc Networking, Mar. 14, 1997, 11 pages.

Sass, "The World Isn't Flat," ARO/DARPA Workshop on Mobile Ad Hoc Networking, Mar. 1997.

Haas, et al., "The Zone Routing Protocol (ZRP) for Ad Hoc Networks," Internet Draft, Mobile Ad Hoc Networking Working Group, Aug. 1998.

Macker, "Mobile ad Hoc Networking," MILCOM 1997 Panel on Ad Hoc Networks, Monterey, CA Nov. 1997.

Park, et al., "Temporally-Ordered Routing Algorithm (TORA)," Internet Draft, Mobile Ad Hoc Networking Working Group, Jul. 20, 2001, 20 pages.

ARO/DARPA Workshop on Mobile Ad Hoc Networking, University of Maryland, Institute for Systems Research, Mar. 14, 1997, 3 pages.

* cited by examiner

Mobile Memory Message Queueing (M3Q)

MOBILE LINK SELECTION METHOD FOR ESTABLISHING HIGHLY EFFICIENT COMMUNICATIONS BETWEEN MOBILE DEVICES

CROSS-REFERENCE TO RELATED APPLICATIONS

The present patent application claims priority under 35 U.S.C. §119(e) to U.S. Provisional Patent Application No. 60/307,330, filed Jul. 24, 2001.

BACKGROUND OF THE INVENTION

1. Field of the Invention

The present invention relates to a method and apparatus for selecting mobile links for establishing communications between respective mobile devices and, more particularly, to a method and apparatus for selecting communications links best suited to current conditions from a number of possible communications links as a mobile link moves into and out of range of other wireless communications devices.

2. Description of Related Art

Communications technologies are becoming pervasive at a fast pace. As many people spend considerable amounts of time in an automobile, it will be increasingly a locus of communication. Today, the communications is either simple one-way communication such as radio reception, or an automobile version of the ubiquitous cellular telephone. It is the object of the present invention to provide more sophisticated data communication based on messaging.

Messaging is a form of communication that is performed on an as-needed basis, meaning that there is no communication unless there is a message. A message is an arbitrary unit of data used to communicate between a sender and a receiver, as well as other participating parties. So, for example, a media server might use messages containing video clips to service a client. Such messages can be used in modern communication systems to carry many types of traffic: voice, video, graphics as well as text messages.

A problem well known to those skilled in the art is the problem of reliable message delivery, where the communication from sender to receiver, or vice versa, must be reliable. This problem is acute in a mobile system such as an automobile, where wireless communication devices are needed to accommodate the mobility inherent in the system. Once committed to wireless, the designer faces the reliability problems inherent in the medium: multipath, noise, signal power, distance from station, and overloaded "cells". These problems are reasonably common, but have been addressed successfully in the voice domain with a large-scale and costly infrastructure of radio transceivers, coupled to handsets with considerable emissions. Message communications are generally more tolerant of delay, but less tolerant of bit errors.

A variety of methods have been developed to forward messages along a path from a sender to a receiver. These methods are largely store-and-forward, meaning that a message is received, its destination is determined, and it is retained until successfully forwarded towards the destination. This is the basis, for example, of the devices called "routers" in the IP-protocol based networks, which contain both forwarding logic and logic for "routing", which are addressed next.

Routing is the set of decisions necessary for a set of forwarding actions to transport a packet sent from a source to a destination. One of the attractive features of the pure packet-switching model is its dynamism—the ability to dynamically select a path over which progress towards the destination can be made. In this model, high reliability is achieved by determining, using and constantly updating (at least in principle) a "best path" through the store-and-forward network. In order to cope with packet losses a reliable transport protocol such as TCP/IP is used—TCP/IP provides acknowledgements and retransmissions to ensure reliability in the face of packet loss and corruption. TCP/IP and similar protocols are well-suited to the application area of Autoband, but further problems arise from wireless phenomena, and the mobility of the automobile itself. The invention disclosed here addresses those problems.

BRIEF SUMMARY OF THE INVENTION

The present invention provides a new solution to reliable communication between automobiles and other communications devices. It relies on multiple available wireless bands and the addition of significant memory buffering to automobiles. The memory buffering is used to enable a new communications model for messages that are called Mobile Message Memory Queues (M3Qs). A significant benefit of the invention is the ease in which it can be incorporated into an automobile.

Two observations will help explain the invention. First is the observation that there are commonly multiple bands (frequencies) or modes (analog, digital) available over which data transmission could take place at any given time. This is exploited, for example, in modern cellular telephones, which can maintain a call across analog and code-division multiple access digital, or dual-band (900 Mhz and 1800 Mhz) GSM phones. The second observation is that message queuing is a natural reaction to conditions where a connection is not maintainable. Message queuing is the idea that messages are held in a queue, e.g., in a memory area, until conditions are opportune for sending the messages. Thus, if the ability to transmit is sporadic, as it is in mobile environments, then message queuing allows the communication system to adapt to the conditions it is experiencing. In essence, the technique trades delay (which is increased) against memory use (increased) and reliability (increased). An example of this technique is queued e-mail, which some systems provide, e.g., Qualcomm's Eudora e-mail system.

The ideas of multiple transmission bands and message queing are combined in accordance with the invention. Autoband utilizes a large-capacity memory buffering system embedded in the automobile, and a multiple band transceiver, to provide an extremely high reliability messaging system. This messaging system can handle packet-switched traffic when packets are treated as messages, and it can provide interactive service in spite of the queing, where bandwidth is adequate.

DETAILED DESCRIPTION OF THE INVENTION

Multiple-Band Transceiver

Figure 1:
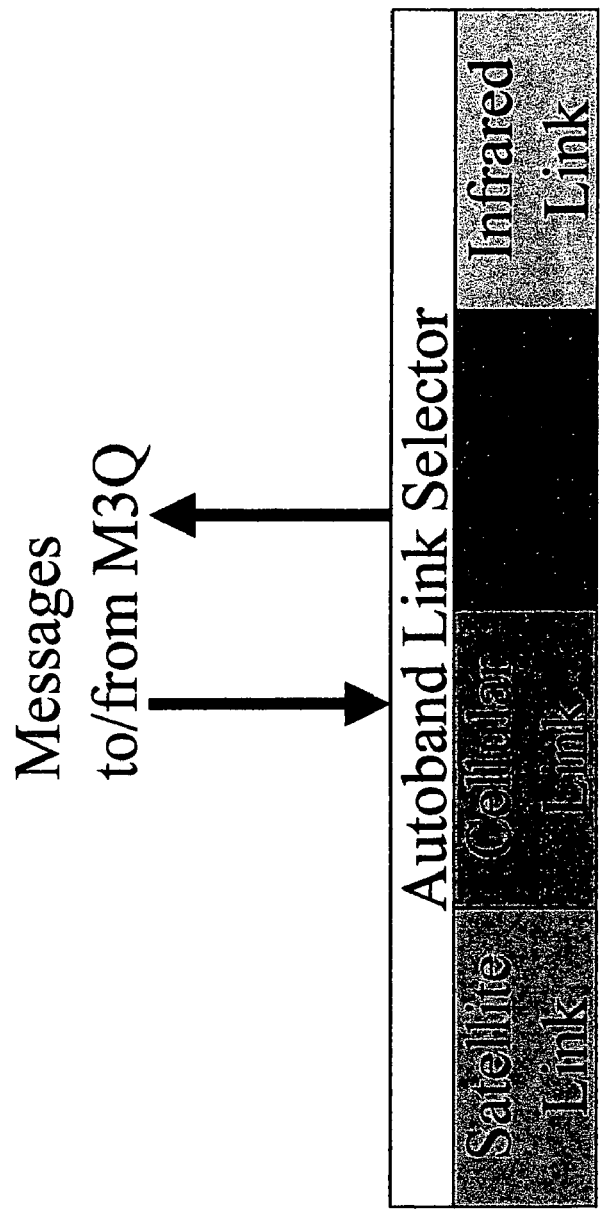
FIG. 1 illustrates a messaging system that can adapt across widely varying types of wireless transmission using a two layer structure in accordance with the invention.

The multiple-frequency transceivers discussed in the introduction above are inadequate for use by the multi-band transceiver of the invention. What is needed is a system that can adapt across widely varying types of wireless transmission. The system of the invention does this with a two layer architecture of the type shown in FIG. 1.

The link technologies (of which only a selected set of the possible technologies are shown), each have characteristics such as bandwidth, cost, power and locality. At any given time, due to factors such as multipath, weather, distance, etc., the optimum capacity of the link may not be available. A key challenge, then, is at any given time to select the link best suited to current conditions. Note that any given technology, such as GSM cellular, may employ its own band multiplexing strategy in addition to that of Autoband. The link selector is a computing device which periodically gathers link status information from each of the links, and selects the link most capable of sending the message.

It can make this selection under the control of a number of programmable criteria, such as:

Is there signal?
How much does link use cost?
How long will signal last at present rate of travel?
Are there any message-specific criteria, such as size or delay?
Is there incoming traffic on the link?
How busy does the link appear to be?
Have we observed message loss on the link, affecting "goodput"?

The link selector accepts messages from the mobile message memory queues (M3Qs), and inserts arriving messages into the M3Qs. It stops accepting messages from the M3Qs when no transmission capacity is available. Because of the design of the automobile, highly persistent M3Qs can be designed (as discussed in the next section), so that failure of the link selector to discover a viable link during some time interval does not affect reliability, only delay.

Each link system employs a (logically) separate antenna or other link external interface system, embedded in the automobile infrastructure. Examples include infrared beneath grilles, antennae embedded in windshield glass, whip antennae, etc. Unlike personal communicators such as cellular phones, the automobile designer has considerably more freedom with respect to size, shape, and a somewhat less restrictive limitation on mass. While size and mass considerations were major inhibitors in marketing satellite telephony (e.g., Iridium), such a device is easily concealed within otherwise unused space in the automobile. Automotive batteries are capable of (from the point of view of modern electronics) sustained operation, even when the automobile is turned off. In our preferred embodiment, link systems would be equipped with independent transformers so that they would interact cleanly with 12V automotive electrical systems.

While the system embodied in Autoband employs discrete physical implementations of links (e.g., discrete circuits), the invention could as easily employ newly-appearing technologies such as software radio, which allow completely dynamic frequency assignment using a computer to control signal generation from a specialized radio module. In this embodiment, the link selector logic would remain the same, but it would control multiple "virtual" links, implemented by retuning the software radio to the appropriate frequency. The limitation of this scheme at present appears to be the optimization of antenna length which can be performed per-link with discrete modules.

Mobile Message Memory Queues

As noted in the previous section, the automotive environment is less demanding of weight and size limitations, and provides substantial resources in terms of electrical power to the designer. Devices have been built to take advantage of such environments in the past: the AT&T 3B20D computer system used a truck battery to provide power to its banks of Dynamic Random Access Memory, and Legato Systems supplied systems for battery-backed RAM. DRAM is the preferred technology for Autoband, as it enjoys large capacity, low-cost, and frequent technology advances. Packaged DRAM, such as Single Inline Memory Modules (SIMMs) is widely available at consumer outlets and other merchandising.

The memory device is operatively coupled to the multiband transceiver discussed in the previous section. The architecture is shown in FIG. 2.

Figure 2:
FIG. 2 illustrates mobile memory message queing (M3Q) in accordance with the invention.
Figure 2:
Figure 2:
Figure 2:
Figure 2:
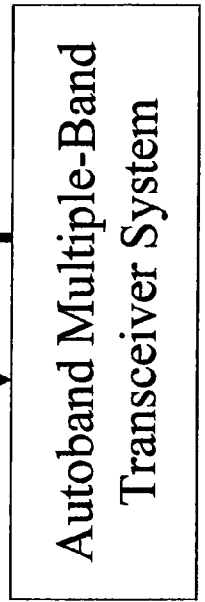

As shown in FIG. 2, the Mobile Memory Message Queing (M3Q) of the invention is a communications system for use in an automobile including a memory device (Mobile Memory Message Queing System) operatively coupled to an Autoband Multi-band Transceiver System. As illustrated, the memory device receives information from a human-computer interface in the automobile and stores the information as a message in the memory device. For transmission, the Multi-band Transceiver System selects a communication link from a plurality of links to transmit the message. The information is then passed from the memory device to the Multi-band Transceiver System for transmission and the message is transmitted. If the link selection results in temporary failure, the message is retained until a link selection is possible.

For receipt of information using the system of FIG. 2, the Multi-band Transceiver System selects a communication link from a plurality of links from which to receive a message and receives the message. The message is passed from the Multi-band Transceiver System to the memory device and the message is stored in a message queue of the memory device. The information is transmitted from the message queue to the human-computer interface in the automobile. In an exemplary embodiment, the link selection is prioritized based on similarity metrics as disclosed in U.S. Pat. No. 5,754,938. In addition, the link selection may be carried out in advance, using prefetching techniques as disclosed in U.S. Pat. No. 5,754,938.

In the system of FIG. 2, the communication link types may include, but are not limited to: satellite radio, analog radio, digital radio, AM, microwave radio, FM, and infrared communication links.

In the system of FIG. 2, the human-computer interface may include a microphone, a camera, or a manually-controlled device. The human-computer interface may also include a speaker, a dashboard indicator, a video display or mechanical means such as a vibration device.

In the system of FIG. 2, the memory device may be a DRAM powered by an automobile battery. The memory device may also include a persistent storage device such as a computer disk. The memory is intended to be large and to significantly augment reliability. Thus multiple implementations are possible. DRAM has attractions as far as speed, cost, etc, are concerned. Adding a disk drive may provide additional reliability, and may allow messages to be stored even when the car's battery is low or detached. In such a situation, the disk drive would transfer data directly from memory when the car is idle for an extended period, and would transfer data directly to memory when the battery and alternator system are reconnected and operating.

The memory can store data in arbitrary formats, such as that for continuous media, text, etc. It provides an interface to existing automotive installations such as radio/CD player systems so that it behaves like a much more sophisticated version of the "Tape/Radio" selection button that is found in most automobiles.

Autoband

The Autoband system combines the mobile memory message queing system and the multiband transceiver. It is able to achieve extremely high reliability. Rather than a message not being sent due to an unavailable link, the only case where an Autoband message is not sent is where:

1. None of the plurality of links available to the Autoband Multi-Band Transceiver is available; and
2. The mobile memory message queuing system fails or the message is manually deleted while Condition 1 stays true.

Autoband can receive as well, which means that content can arrive from a variety of sources using the different links, for playback while the links may be unavailable.

Applications

People have long found the automobile necessary, while finding the basic functions of driving or being a passenger boring. There is clear evidence that communications technology is desirable in automobiles; ranging from CB radios in the 1970s to "hands-free" cellular systems and Global Positioning System receivers in the present generation. These systems are purpose-built, and cannot function if they are out of contact with their transmission medium. They are designed to be continuous or interactive in nature, as there is no use of memory or buffering in the system. Interestingly, while automotive radio receivers have been in place for many years, the desire for high-quality reliable provision of audio led to increasing provision (in luxury automobiles, or after-market) of devices for playback of recorded media, such as 8-track and cassette tape players, and more recently, CD players. Autoband, by combining memory for message queues with an intelligent multiple band transceiver, permits a number of novel applications:

dictation while driving;
receipt of audiobooks for storage in the M3Q for later playback;
receipt of videos or games for passengers for later playback;
audio messaging;
prefetching of maps and tourist information into the M3Q for later use;
provision of high-bandwidth "docking stations" at drive-through restaurants or highway rest areas;
greater separation of base stations, so that messages are stored in the M3Qs where "gaps" exist; and
continuous listening to sources over multiple links. For example, an FM radio station may be fading due to distance limitations, but Autoband could use Satellite Internet services to continue receiving the content from an Internet site carrying the content via some medium such as RealAudio.

What is claimed is:

1. A method of communicating messages from a vehicle using a communications device comprising a memory device operatively coupled to a multi-band transceiver adapted to communicate over a plurality of types of communication links available thereto including at least two of satellite radio, analog radio, digital radio, AM, microwave radio, FM, and/or infrared transmission channels, comprising the steps of: receiving information from an occupant of the vehicle via a human-computer interface in the vehicle; storing the information as a message in the memory device; gathering link status information regarding each of the plurality of types of communication links available to the multi-band transceiver for connecting the communications device to a destination under current transmission conditions including any movement of the vehicle into and out of range of other wireless communications devices; selecting a type of communication link most capable of completing sending of the message to said destination while the communications device and the destination are in communication range of each other under current transmission conditions based on programmable criteria including the size of the message to be transmitted, delays in the link, and how long the link is expected to last based on a rate of travel of the vehicle for said plurality of types of communication links available to the multi-band transceiver to transmit the message to said destination; passing the information from the memory device to the multi-band transceiver for transmission; and transmitting the message over a communication link of the selected type of communication link to said destination.

2. A method as in claim 1, wherein when the step of selecting a type of communication link is unsuccessful, the message is retained in the memory device until the step of selecting a type of communication link is successful.

3. A method as in claim 1, further comprising providing the information to the human-computer interface from a microphone, a camera, and/or a manually-controlled input device.

4. A method of communicating messages to a vehicle using a communications device in the vehicle comprising a memory device operatively coupled to a multi-band transceiver adapted to communicate over a plurality of types of communication links available thereto including at least two of satellite radio, analog radio, digital radio, AM, microwave radio, FM, and/or infrared transmission channels, comprising the steps of: gathering link status information regarding each of the plurality of types of communication links available to the multi-band transceiver for connecting the communications device to a source of messages under current transmission conditions including any movement of the vehicle into and out of range of other wireless communications devices; selecting a type of communication link most capable of completing sending of the message to the communications device in the vehicle from the source of messages while the communications device and the source of messages are in communication range of each other under current transmission conditions based on programmable criteria including the size of the message to be transmitted, delays in the link, and how long the link is expected to last based on a rate of travel of the vehicle for said plurality of types of communication links from which to receive a message from said source of messages; receiving the message from the source of messages over a communication link of the selected type of communication link at the multi-band transceiver; passing the message from the multi-band transceiver to the memory device; storing the message in the memory device; and transmitting information from the message to a human-computer interface in the vehicle.

5. A method as in claim 4, wherein the step of selecting a type of communication link is carried out in advance of receiving the message using prefetching techniques.

6. A method as in claim 4, wherein the step of transmitting information to the human-computer interface includes broadcasting the information using a speaker, displaying the information on a dashboard indicator or a video display, and/or presenting the information using a vibrating device.

7. A method as in claim 4, wherein the receiving step comprises receiving the message over said communication link and a second communication link, comprising the further step of continuing to receive the message over said second communication link when the transmission of said message over said communication link fades.

8. A communications system for communicating messages to/from a vehicle, comprising: a human-computer interface in the vehicle that accepts information from an occupant of the vehicle for transmission and presents to the occupant received information from said communications system; a memory device connected to the human-computer interface so as to store the information provided from the occupant as a message and received information to be presented to the occupant; and a multi-band transceiver connected to said memory device and adapted to communicate over a plurality of types of communication links available thereto including at least two of satellite radio, analog radio, digital radio, AM, microwave radio, FM, and/or infrared transmission channels to a source or destination, said multi-band transceiver including a link selector that gathers link status information regarding each of a plurality of types of communication links available to the multi-band transceiver under current conditions including any movement of the vehicle into and out of range of other wireless communications devices, wherein for transmission said multi-band transceiver selects a type of communication link most capable of completing sending of the message to said destination while the transceiver and the destination are in communication range of each other under current transmission conditions based on programmable criteria including the size of the message to be transmitted, delays in the link, and how long the link is expected to last based on a rate of travel of the vehicle for said plurality of types of communication links available to the multi-band transceiver to transmit the message to said destination, and transmits the message over a selected communication link of the type of communication link, and wherein for reception said multi-band transceiver selects a type of communication link most capable of completing sending of the message to the transceiver in the vehicle from the source of messages while the transceiver and the source of messages are in communication range of each other under current transmission conditions based on said programmable criteria for said plurality of types of communication links from which to receive a message from the source of messages, and receives the message from a selected communication link of the type of communication link.

9. A system as in claim 8, wherein the memory device comprises a DRAM powered by a vehicle battery.

10. A system as in claim 9, wherein the memory device further comprises a computer disk.

11. A system as in claim 8, wherein the human-computer interface includes a microphone, a camera, and/or a manually-controlled input device for receiving information from the occupant.

12. A system as in claim 8, wherein the human-computer interface includes a speaker, a dashboard indicator, a video display, and/or a vibrating device for presenting the received information.

\* \* \* \* \*

UNITED STATES PATENT AND TRADEMARK OFFICE
CERTIFICATE OF CORRECTION

PATENT NO. : 8,160,586 B2
APPLICATION NO. : 10/205182
DATED : April 17, 2012
INVENTOR(S) : Herz et al.

It is certified that error appears in the above-identified patent and that said Letters Patent is hereby corrected as shown below:

On Page 2, in Item (56), under "OTHER PUBLICATIONS", in Column 1, Line 4, delete "(MOBIOC)," and insert -- (MOBIHOC), --, therefor.

On Page 2, in Item (56), under "OTHER PUBLICATIONS", in Column 1, Line 39, delete "IRTF" and insert -- IETF --, therefor.

On Page 2, in Item (56), under "OTHER PUBLICATIONS", in Column 2, Line 3, delete "Workshops.MANET" and insert -- Workshops/MANET --, therefor.

On Page 2, in Item (56), under "OTHER PUBLICATIONS", in Column 2, Line 17, delete "http://www.ieff.org," and insert -- http://www.ietf.org, --, therefor.

On Page 2, in Item (56), under "OTHER PUBLICATIONS", in Column 2, Line 26, delete "IRTF" and insert -- IETF --, therefor.

In the Claims:

In Column 8, Line 1, in Claim 8, delete "a selected communication link of the type of" and insert -- a communication link of the selected type of --, therefor.

In Column 8, Lines 10-11, in Claim 8, delete "a selected communication link of the type of" and insert -- a communication link of the selected type of --, therefor.

Signed and Sealed this
Twenty-fifth Day of September, 2012

David J. Kappos
*Director of the United States Patent and Trademark Office*